United States Patent
Jonishi et al.

(10) Patent No.: US 10,983,225 B2
(45) Date of Patent: Apr. 20, 2021

(54) RADIATION DETECTOR MANUFACTURING METHOD

(71) Applicant: HAMAMATSU PHOTONICS K.K., Hamamatsu (JP)

(72) Inventors: Hidenori Jonishi, Hamamatsu (JP); Yutaka Kusuyama, Hamamatsu (JP); Hirotake Osawa, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 129 days.

(21) Appl. No.: 16/088,481

(22) PCT Filed: Jan. 26, 2017

(86) PCT No.: PCT/JP2017/002748
§ 371 (c)(1),
(2) Date: Sep. 26, 2018

(87) PCT Pub. No.: WO2017/169048
PCT Pub. Date: Oct. 5, 2017

(65) Prior Publication Data
US 2019/0113634 A1    Apr. 18, 2019

(30) Foreign Application Priority Data
Mar. 30, 2016  (JP) .............................. JP2016-068619

(51) Int. Cl.
*G01T 1/20*    (2006.01)
*G01T 1/202*   (2006.01)

(52) U.S. Cl.
CPC .............. *G01T 1/2018* (2013.01); *G01T 1/20* (2013.01); *G01T 1/202* (2013.01)

(58) Field of Classification Search
CPC ................................ G01T 1/24; G01T 1/2018
See application file for complete search history.

(56) References Cited

U.S. PATENT DOCUMENTS 6,891,164 B2 *  5/2005  Suzuki .................. G01T 1/2018
                                                    250/336.1
7,067,817 B2 *  6/2006  Suganuma ............ G01T 1/2928
                                                    250/370.08

(Continued)

FOREIGN PATENT DOCUMENTS

| CN | 1844953 B | 6/2012 |
| CN | 102466807 B | 3/2015 |

(Continued)

OTHER PUBLICATIONS

International Preliminary Report on Patentability dated Oct. 11, 2018 for PCT/JP2017/002748.

*Primary Examiner* — Mark A Osele
*Assistant Examiner* — Evan T Hulting
(74) *Attorney, Agent, or Firm* — Faegre Drinker Biddle & Reath LLP (57) ABSTRACT

A method of manufacturing a radiation detector includes a first step of forming a scintillator layer including a plurality of columnar crystals on a main surface of a sensor panel including a plurality of photoelectric converting elements by a vapor phase deposition method, a second step of forming a resin frame on the main surface to surround the scintillator layer and disposing a frame member made of an inorganic solid material to be in contact with the resin frame along an outer circumference of the resin frame, a third step of sealing the scintillator layer by bonding a protective plate to the resin frame, and a fourth step of curing the resin frame.

7 Claims, 10 Drawing Sheets

(56) References Cited

U.S. PATENT DOCUMENTS

| | | | |
|---|---|---|---|
| 9,625,588 B2* | 4/2017 | Frisch | ............... G01T 1/208 |
| 2003/0001100 A1 | 1/2003 | Dejule | |
| 2003/0107001 A1* | 6/2003 | Baumgartner | ........ G01T 1/2002 |
| | | | 250/370.11 |

FOREIGN PATENT DOCUMENTS

| | | |
|---|---|---|
| CN | 102655160 B | 8/2015 |
| EP | 1258737 A1 | 11/2002 |
| JP | H2-296200 A | 12/1990 |
| JP | 2003-262676 A | 9/2003 |
| JP | 2003-279656 A | 10/2003 |
| JP | 2004-335580 A | 11/2004 |
| JP | 2010-243188 A | 10/2010 |
| JP | 4764407 B2 | 9/2011 |
| JP | 2012-185123 A | 9/2012 |
| JP | 2015-232503 A | 12/2015 |
| WO | WO-01/051951 A1 | 7/2001 |
| WO | WO-2011/108156 A1 | 9/2011 |

* cited by examiner

RADIATION DETECTOR MANUFACTURING METHOD

TECHNICAL FIELD

An aspect of the present invention relates to a method of manufacturing a radiation detector.

BACKGROUND ART

Patent Literature 1 discloses a detector array used in an X-ray imaging system. This detector array has a detector element that is provided on a glass substrate, a scintillator that is constituted of columnar crystals formed on the detector element, and a sheet that is disposed on the scintillator and reflects visible light. The scintillator and the sheet are sealed by a cover fixed to the glass substrate. For example, the cover and the glass substrate are sealed by a metal frame bonded using an epoxy sealant. The metal frame surrounds the scintillator away from the scintillator.

CITATION LIST

Patent Literature

Patent Literature 1: Japanese Unexamined Patent Publication No. 2003-279656

SUMMARY OF INVENTION

Technical Problem

Generally, a scintillator layer constituted of columnar crystals formed of CsI and the like has deliquescence. Therefore, in a radiation detector having a configuration in which a scintillator layer is surrounded with a frame body, it is desirable to retain high moisture barrier properties in a region on an inner side of the frame body.

An object of an aspect of the present invention is to provide a method of manufacturing a radiation detector in which moisture barrier properties of a scintillator layer are enhanced.

Solution to Problem

According to an embodiment, there is provided a method of manufacturing a radiation detector including a first step of forming a scintillator layer including a plurality of columnar crystals on a main surface of a sensor panel including a plurality of photoelectric converting elements by a vapor phase deposition method, a second step of forming a resin frame on the main surface to surround the scintillator layer and disposing a frame member made of an inorganic solid material to be in contact with the resin frame along an outer circumference of the resin frame, a third step of sealing the scintillator layer by bonding a protective plate to the resin frame, and a fourth step of curing the resin frame.

According to such a method of manufacturing a radiation detector, the resin frame is disposed on an inner side to surround the scintillator layer, and the frame member made of an inorganic solid material is disposed on an outer side of the resin frame. Since the inorganic solid material has moisture barrier properties, moisture does not permeate through the frame member. Therefore, the frame member made of an inorganic solid material is in contact with the outer circumference of the resin frame, so that moisture is prevented from permeating through the resin frame. Therefore, moisture barrier properties of the scintillator layer are enhanced.

In addition, in the embodiment, the resin frame may include a first resin frame and a second resin frame. In the second step, the first resin frame may be formed to surround the scintillator layer, the frame member may be disposed to be in contact with the first resin frame along the outer circumference of the first resin frame, and the second resin frame may be formed on the first resin frame to surround the scintillator layer. In the third step performed after the second step, the resin frame needs to be formed to be higher than the frame member. Since the second resin frame is formed after the frame member is disposed, it is easy to check that the second resin frame has been formed to have a height greater than that of the frame member.

In addition, in the embodiment, in the second step, the first resin frame may be cured after the frame member is disposed and before the second resin frame is formed. According to this configuration, the frame member is prevented from being misaligned when the second resin frame is formed.

In addition, the embodiment may further include a fifth step of covering a front surface and a side surface of the scintillator layer with an intermediate layer, between the first step and the second step. According to this configuration, the resin frame is prevented from directly coming into contact with a part around the scintillator layer and a solvent is prevented from infiltrating into the part around the scintillator layer.

In addition, in the embodiment, in the second step, the resin frame may be formed to be in contact with the intermediate layer. According to this configuration, an effective region of the scintillator layer in a region within the resin frame is increased. An effective region indicates a region in which a scintillator layer is formed on the main surface.

In addition, in the embodiment, the resin frame may include ultraviolet curing resin. Since a curing time of ultraviolet curing resin is short, a manufacturing time is shortened.

In addition, in the embodiment, the frame member may be a glass rod. The frame member is easily disposed on an outer side of the resin frame by using the glass rod.

Advantageous Effects of Invention

According to the method of manufacturing a radiation detector of the embodiment, moisture barrier properties in a region in which a scintillator layer is formed are enhanced.

DESCRIPTION OF EMBODIMENT

Hereinafter, aspects of embodiments will be specifically described with reference to the drawings. For convenience, there are cases in which the same reference signs are applied to substantially the same elements and description thereof is omitted. A radiation detector in the following description performs detection by converting radiation, such as X-rays, into scintillation light, such as visible light. For example, such a radiation detector can be used as a radiation imaging device in a mammography apparatus, a chest examination apparatus, a CT apparatus, a dental and oral imaging apparatus, a radiation camera, and the like.

First Embodiment

Figure 1:
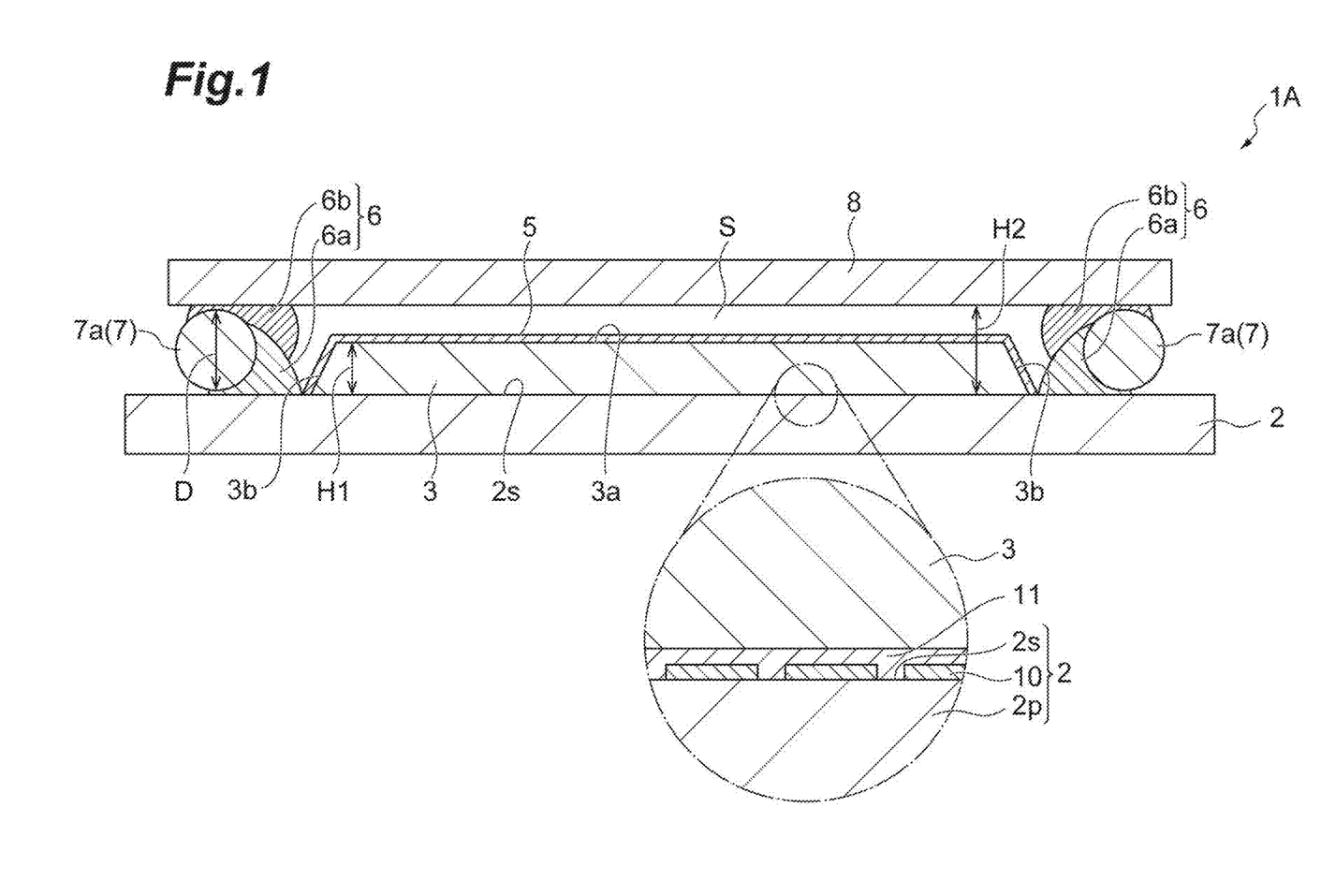
FIG. 1 is a cross-sectional view of a radiation detector according to an embodiment.
Figure 2:
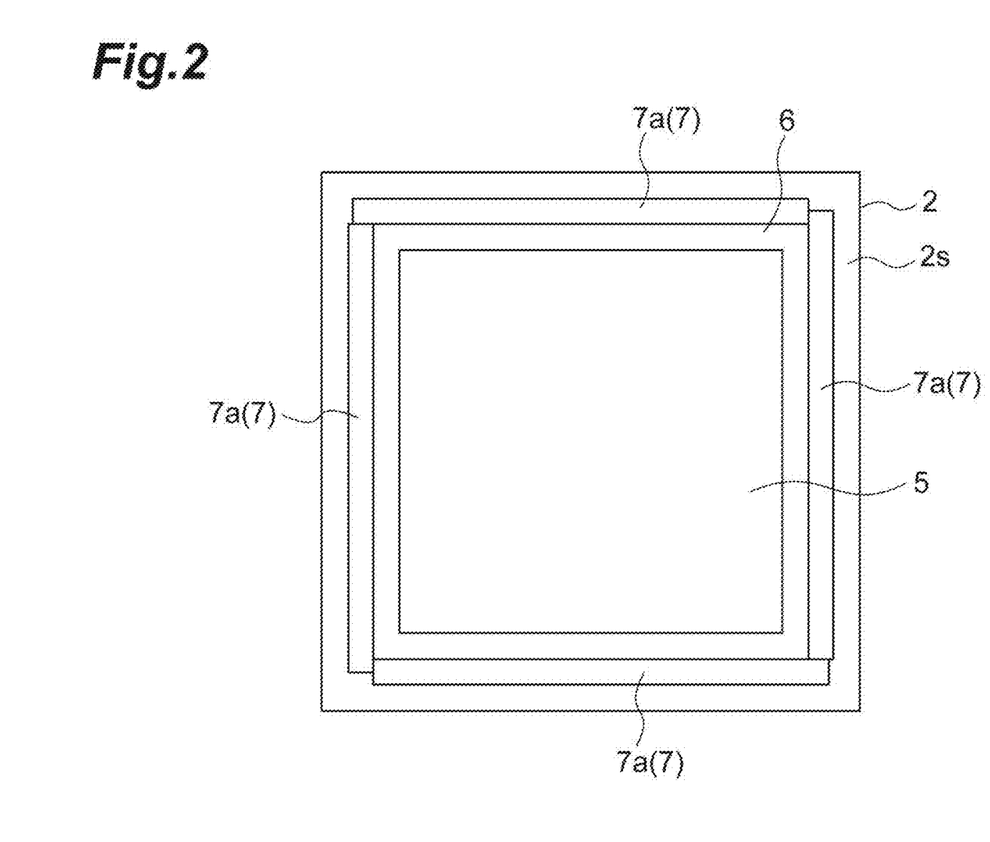
FIG. 2 is a plan view of the radiation detector illustrated in FIG. 1.

FIG. 1 is a cross-sectional view of a radiation detector according to the present embodiment. FIG. 2 is a plan view of the radiation detector illustrated in FIG. 1. In FIG. 2, no protective plate is illustrated. As illustrated in FIGS. 1 and 2, a radiation detector 1A includes a sensor panel 2, a scintillator layer 3, an intermediate layer 5, a resin frame 6, a frame member 7, and a protective plate 8.

The sensor panel 2 has a rectangular plate shape, for example, and has a main surface 2s and a plurality of photoelectric converting elements 10 formed on the main surface 2s. More specifically, the sensor panel 2 has a plate-shaped base portion 2p including the main surface 2s. In addition, the photoelectric converting elements 10 are arranged in a two-dimensional shape along the main surface 2s. A film portion 11 such as a passivation film or a flattened film is formed on the main surface 2s and the photoelectric converting elements 10.

The scintillator layer 3 generates scintillation light such as visible light when radiation, such as X-rays, is incident thereon. The scintillator layer 3 is provided on the main surface 2s and the photoelectric converting elements 10 with the film portion 11 interposed therebetween. The scintillator layer 3 is optically coupled to the photoelectric converting elements 10. Therefore, the photoelectric converting elements 10 input scintillation light generated in the scintillator layer 3 and output an electrical signal corresponding to the scintillation light. The electrical signal is taken out through a wiring (not illustrated) or the like. Accordingly, the radiation detector 1 detects radiation.

The scintillator layer 3 is formed in a rectangular area on the main surface 2s when seen in a direction intersecting (for example, orthogonal to) the main surface 2s, for example. An inclined portion is provided in an outer edge portion of the scintillator layer 3. In the inclined portion, a thickness H1 of the scintillator layer 3 decreases in a direction from the center toward an edge of the scintillator layer 3. Therefore, the scintillator layer 3 has a trapezoidal cross-sectional shape in its entirety, for example. That is, the scintillator layer 3 has a front surface (upper surface) 3a formed along the main surface 2s, and an inclined side surface 3b formed around the front surface 3a.

The thickness H1 of the scintillator layer 3 (thickness excluding the inclined portion described above) is approximately 600 μm, for example. The scintillator layer 3 includes a plurality of columnar crystals in a scintillator material. For example, the scintillator material is a material having CsI (CsI:Tl) as a main component.

The intermediate layer 5 entirely covers the front surface 3a of the scintillator layer 3 and entirely covers the side surface 3b. That is, a circumferential edge of the intermediate layer 5 comes into contact with the main surface 2s of the sensor panel 2, and there is no gap between the circumferential edge of the intermediate layer 5 and the main surface 2s. For example, the intermediate layer 5 prevents a solvent included in ultraviolet curing resin and the like from infiltrating into the scintillator layer 3. In addition, for example, the intermediate layer 5 has optical functions of reflecting and absorbing scintillation light. That is, the intermediate layer 5 serves as a light reflection layer or a light absorption layer for scintillation light generated in the scintillator layer 3.

The resin frame 6 is provided on the main surface 2s to surround the scintillator layer 3 when seen in a direction intersecting the main surface 2s of the sensor panel 2. For example, the resin frame 6 has a rectangularly annular shape. A height H2 of the resin frame 6 from the main surface 2s is greater than a height H1 of the scintillator layer 3 from the main surface 2s. The resin frame 6 is interposed between the main surface 2s and the protective plate 8 and joins the main surface 2s and the protective plate 8 to each other. In the present embodiment, the resin frame 6 is in contact with the intermediate layer 5 covering the scintillator layer 3. More specifically, an outer circumferential edge of the intermediate layer 5 and an inner circumferential edge of the resin frame 6 are in contact with each other. In other words, the scintillator layer 3 extends along the resin frame 6 to be in contact with the resin frame 6 with the intermediate layer 5 interposed therebetween. For example, the resin frame 6 is resin which has low moisture permeability and is constituted of epoxy resin or the like having ultraviolet curing properties.

As illustrated in FIG. 1, the resin frame 6 is formed with a first resin frame 6a and a second resin frame 6b. In the present embodiment, the first resin frame 6a and the second resin frame 6b are formed of similar ultraviolet curing resin. Therefore, in the drawings, the first resin frame 6a and the second resin frame 6b are depicted in a schematically separate manner. However, the first resin frame 6a and the second resin frame 6b are integrated after being cured.

The frame member 7 is mounted on the main surface 2s in a state of being in contact with the resin frame 6 along an outer circumference of the resin frame 6. The frame member 7 is formed of an inorganic solid material. In the present embodiment, the frame member 7 is constituted of four glass rods 7a in which glass is used as a raw material. All of the four glass rods 7a are formed in columnar shapes having a uniform diameter D and have the same shape as one another. The diameter D of the glass rod 7a is greater than the height H1 of the scintillator layer 3 from the main surface 2s, that is, approximately 1 mm, for example. The four glass rods 7a constitute the frame member 7 having a rectangularly annular shape in which an end portion of one glass rod 7a comes into contact with an end portion of another glass rod 7a (refer to FIG. 2). An inner edge side of the frame member 7 is in contact with the resin frame 6 along the outer circumference of the resin frame 6. On the other hand, an outer edge side of the frame member 7 is exposed from the resin frame 6. That is, a portion of the frame member 7 on the inner edge side is buried in the resin frame 6, and the remaining portion of the frame member 7 on the outer edge side is exposed from the resin frame 6.

For example, the protective plate 8 has a rectangularly flat plate shape extending along the main surface 2s. As an example, the size of the protective plate 8 is larger than the size of the frame member 7 and is smaller than the size of the sensor panel 2 in a direction along the main surface 2s. The size of the frame member 7 is a distance between the outer edges of parts facing each other along the main surface 2s in the frame member 7. For example, the thickness of the protective plate 8 ranges approximately from 0.5 mm to 2.0 mm. For example, the protective plate 8 is formed of a material containing glass, metal, or carbon. Examples thereof include a glass plate, an aluminum plate, and a carbon fiber reinforced plastic (CFRP) plate. Radiation is transmitted through the protective plate 8.

The protective plate 8 is bonded to the resin frame 6 in a state of facing the front surface 3a of the scintillator layer 3 covered with the intermediate layer 5. A distance from the main surface 2s of the sensor panel 2 to the protective plate 8 (height H2) is approximately the same as the diameter D of the glass rod. The protective plate 8 is disposed to cover the scintillator layer 3, the intermediate layer 5, the resin frame 6, and the frame member 7 when seen in a direction intersecting the main surface 2s. The protective plate 8, the main surface 2s, and the resin frame 6 form a sealed space in which the scintillator layer 3 and the intermediate layer 5 are disposed. In addition, the scintillator layer 3 and the intermediate layer 5, and the protective plate 8 are disposed away from each other. That is, a space S is formed between the scintillator layer 3 and the intermediate layer 5, and the protective plate 8.

Figure 3:
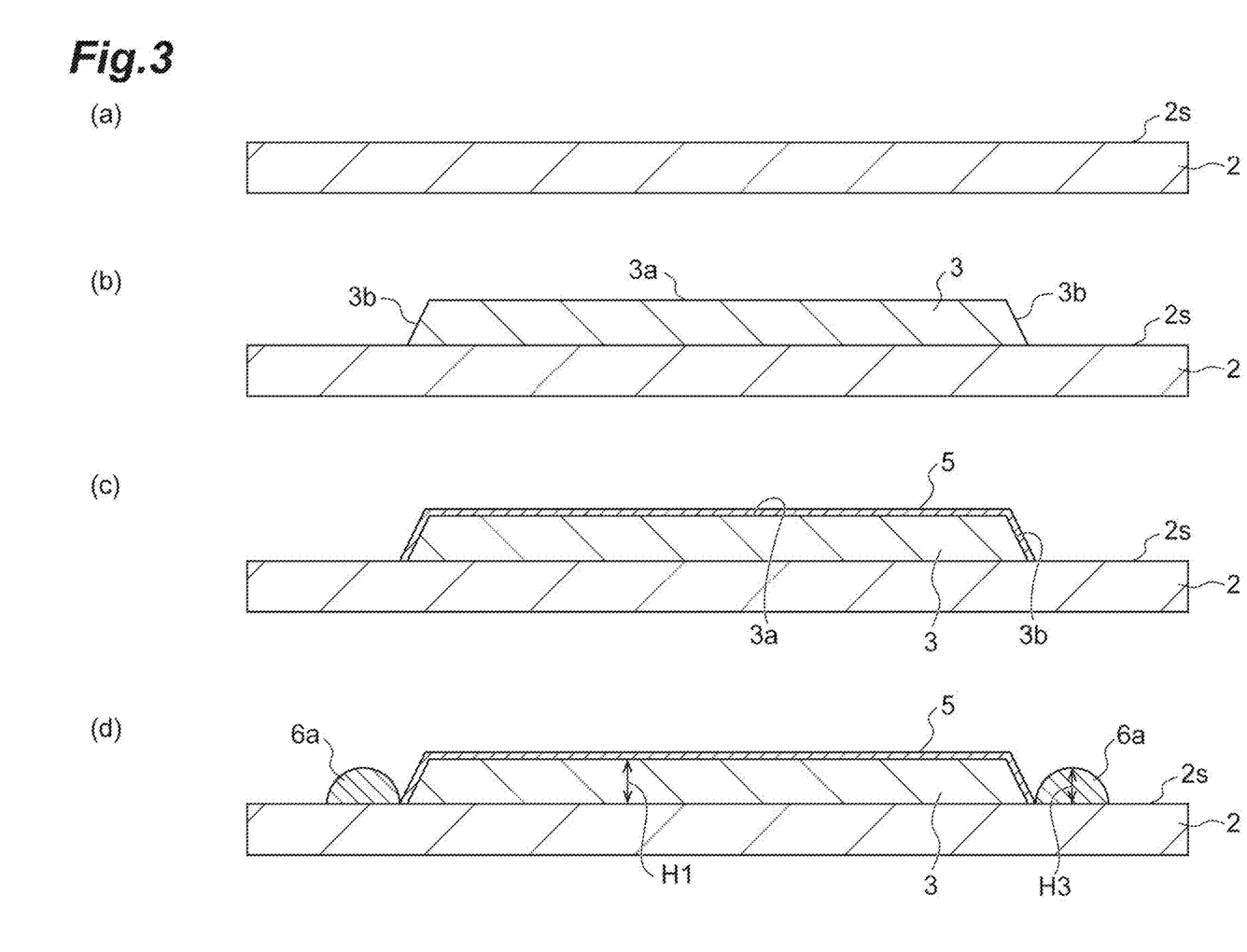
FIG. 3 is a view illustrating a step of manufacturing the radiation detector illustrated in FIG. 1.
Figure 4:
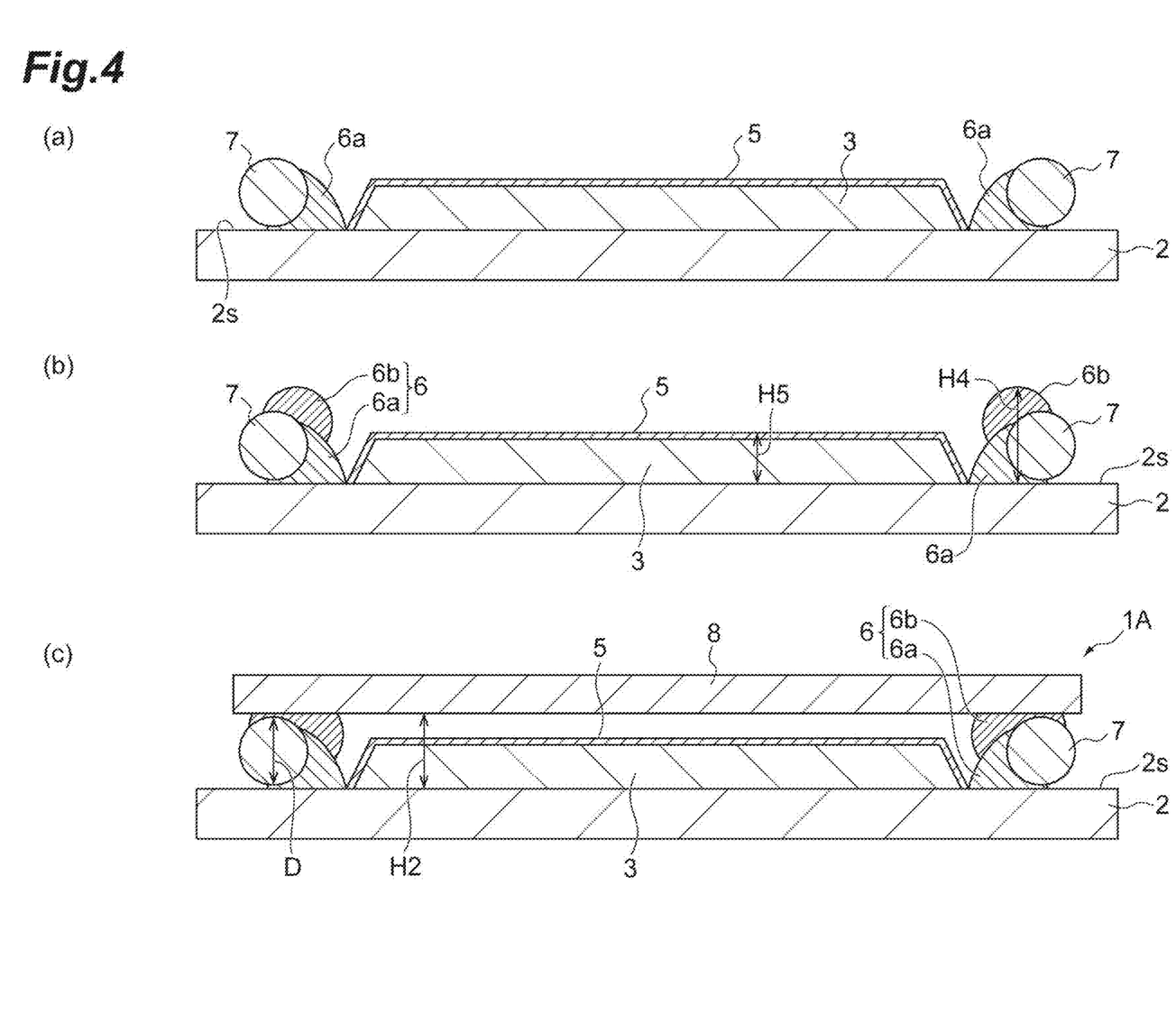
FIG. 4 is a view illustrating the step of manufacturing the radiation detector illustrated in FIG. 1.

Next, a step of manufacturing the radiation detector 1A will be described. FIG. 3 and FIG. 4 are views illustrating a step of manufacturing a radiation detector.

First, the sensor panel 2 in which the plurality of photoelectric converting elements 10 are formed on the main surface 2s is prepared (FIG. 3(a)). Subsequently, as illustrated in FIG. 3(b), the scintillator layer 3 including a plurality of columnar crystals is formed on the main surface 2s of the sensor panel 2 by a vapor phase deposition method (first step). In this step, for example, a material for a fluorescent body (for example, CsI:Tl and CsBr:Eu) is subjected to vacuum deposition on the main surface 2s of the sensor panel 2 such that columnar crystals of the fluorescent body grow on the main surface 2s, thereby forming the scintillator layer 3. Accordingly, a trapezoidal scintillator layer 3 having the front surface 3a and the side surface 3b in a cross-sectional view is formed.

Subsequently, as illustrated in FIG. 3(c), the intermediate layer 5 covers the front surface 3a and the side surface 3b of the scintillator layer 3 (fifth step). Specifically, for example, a coating agent constituted of a pigment and binder resin having optical functions of reflecting and absorbing scintillation light is prepared. Examples of a pigment reflecting scintillation light include white pigments such as titanium dioxide, yttrium oxide, zinc oxide, and aluminum oxide. In addition, examples of a pigment absorbing scintillation light include black pigments such as carbon black and triiron tetraoxide. In addition, examples of binder resin include acrylic organic resin; and urethane, epoxy, fluorine, phenol, polyimide, polyvinyl alcohol, polyethylene, polyester, polycarbonate, and polyurethane-based organic resin. Then, the front surface 3a and the side surface 3b of the scintillator layer 3 are entirely coated with a coating agent to form a resin layer. Subsequently, the resin layer is dried and cured, so that the intermediate layer 5 is produced. After the intermediate layer 5 is produced, the scintillator layer 3 may be activated through baking or the like.

Subsequently, as illustrated in FIG. 3(d), the first resin frame 6a is formed on the main surface 2s to surround the scintillator layer 3 (second step). For example, the first resin frame 6a is ultraviolet curing resin such as epoxy resin, acrylic resin, and urethane resin. In this step, in order to make the forming position of the first resin frame 6a closer to the scintillator layer 3, the first resin frame 6a is formed to be in contact with the intermediate layer 5. For example, as in the illustrated example, the first resin frame 6a may be disposed such that the outer circumferential edge of the intermediate layer 5 and the inner circumferential edge of the first resin frame 6a are in contact with each other. A height H3 of the first resin frame 6a to be formed may be determined based on the viscosity of using resin. For example, the height H3 of the first resin frame 6a may be increased to be higher than half the height H1 of the scintillator layer 3.

Subsequently, as illustrated in FIG. 4(a), the frame member 7 is disposed to be in contact with the first resin frame 6a along the outer circumference of the first resin frame 6a (second step). In this step, for example, the glass rods 7a disposed on the main surface 2s are moved from the outer side of the first resin frame 6a toward the first resin frame 6a, so that the glass rods 7a come into contact with the first resin frame 6a. The four glass rods 7a are disposed such that an end portion of a glass rod 7a comes into contact with an end portion of another glass rod 7a, and thus, the frame member 7 having a rectangularly annular shape is formed (refer to FIG. 2). Subsequently, after the frame member 7 is formed, the first resin frame 6a is cured (fourth step). In the present embodiment, the first resin frame 6a before being cured is irradiated with ultraviolet light, so that the first resin frame 6a is cured. Accordingly, the glass rods 7a are fixed to the first resin frame 6a.

Subsequently, as illustrated in FIG. 4(b), the second resin frame 6b is formed on the first resin frame 6a to surround the scintillator layer 3 (second step). In this step, for example, it is possible to use ultraviolet curing resin similar to the ultraviolet curing resin used for forming the first resin frame 6a. Similar to the first resin frame 6a, the second resin frame 6b is formed on the first resin frame 6a to surround the scintillator layer 3. At this time, an end portion of the second resin frame 6b on a side opposite to the main surface 2s is at a position higher than the frame member 7. As in the illustrated example, the second resin frame 6b may be formed on the first resin frame 6a, and the second resin frame 6b may be formed on the glass rods 7a. In addition, in this step, a height H4 of the second resin frame 6b from the main surface 2s is formed to be higher than a height H5 of the intermediate layer 5. An inner circumferential surface of the frame member 7 is covered with the first resin frame 6a and the second resin frame 6b. On the other hand, an outer circumferential surface of the frame member 7 is exposed from the first resin frame 6a and the second resin frame 6b.

Subsequently, as illustrated in FIG. 4(c), the protective plate 8 is bonded to the resin frame 6, so that the scintillator layer 3 and the intermediate layer 5 are sealed (third step). In this step, the protective plate 8 is disposed to be in contact with the whole circumference of the second resin frame 6b before being cured. At this time, the second resin frame 6b is deformed due to the protective plate 8 pressed to the sensor panel 2 side, or the dead weight of the protective plate 8. Accordingly, the distance (height H2) from the main surface 2s of the sensor panel 2 to the protective plate 8 is approximately the same as the height of the frame member (the diameter D of the glass rod). The second resin frame 6b and the protective plate 8 are bonded to each other, so that a space sealed by the main surface 2s, the resin frame 6, and the protective plate 8 is formed.

Subsequently, the second resin frame 6b is cured (fourth step). In the present embodiment, the second resin frame 6b before being cured is irradiated with ultraviolet light, so that the second resin frame 6b is cured. Accordingly, the protective plate 8 is fixed to the second resin frame 6b. That is, the protective plate 8 is fixed on the main surface 2s with the resin frame 6 interposed therebetween, and then the radiation detector 1A is brought to completion.

According to the method of manufacturing a radiation detector described above, the resin frame 6 is disposed on an inner side to surround the scintillator layer 3, and the frame member 7 made of an inorganic solid material is disposed on an outer side of the resin frame 6. Since the inorganic solid material has moisture barrier properties, moisture does not permeate through the frame member 7. Therefore, the frame member 7 made of an inorganic solid material is in contact with the outer circumference of the resin frame 6, so that moisture is prevented from permeating through the resin frame 6. Therefore, moisture barrier properties of the scintillator layer 3 are enhanced.

In addition, in a step of disposing the resin frame 6 and the frame member 7, the first resin frame 6a is formed to surround the scintillator layer 3, and the frame member 7 is disposed to be in contact with the first resin frame 6a along the outer circumference of the first resin frame 6a. Then, the second resin frame 6b is formed on the first resin frame 6a to surround the scintillator layer 3. In a step of bonding the protective plate 8, the resin frame 6 needs to be formed to be higher than the frame member 7. Since the second resin frame 6b is formed after the frame member 7 is disposed, it is easy to check that the second resin frame 6b has been formed to have a height greater than that of the frame member 7.

In addition, in the step of disposing the resin frame 6 and the frame member 7, the first resin frame 6a is cured after the frame member 7 is disposed and before the second resin frame 6b is formed. According to this configuration, the frame member 7 is prevented from being misaligned when the second resin frame 6b is formed.

In addition, the front surface 3a and the side surface 3b of the scintillator layer 3 are covered with the intermediate layer 5 before the resin frame 6 is formed. According to this configuration, a solvent included in the resin frame 6 is prevented from infiltrating into the scintillator layer 3.

In addition, in the step of disposing the resin frame 6 and the frame member 7, the resin frame 6 is formed to be in contact with the intermediate layer 5. According to this configuration, the effective region of the scintillator layer 3 in a region within the resin frame 6 is increased.

In addition, ultraviolet curing resin is included as a material for forming the resin frame 6. Since a curing time of ultraviolet curing resin is short, a manufacturing time is shortened. In addition, in the present embodiment, the glass rods 7a are used as the frame member 7. In this case, ultraviolet light is transmitted through the glass rods 7a, so that ultraviolet curing resin forming the resin frame 6 is efficiently irradiated with ultraviolet light. In addition, the frame member 7 is easily disposed on the outer side of the resin frame 6 by using the glass rods 7a.

Figure 5:
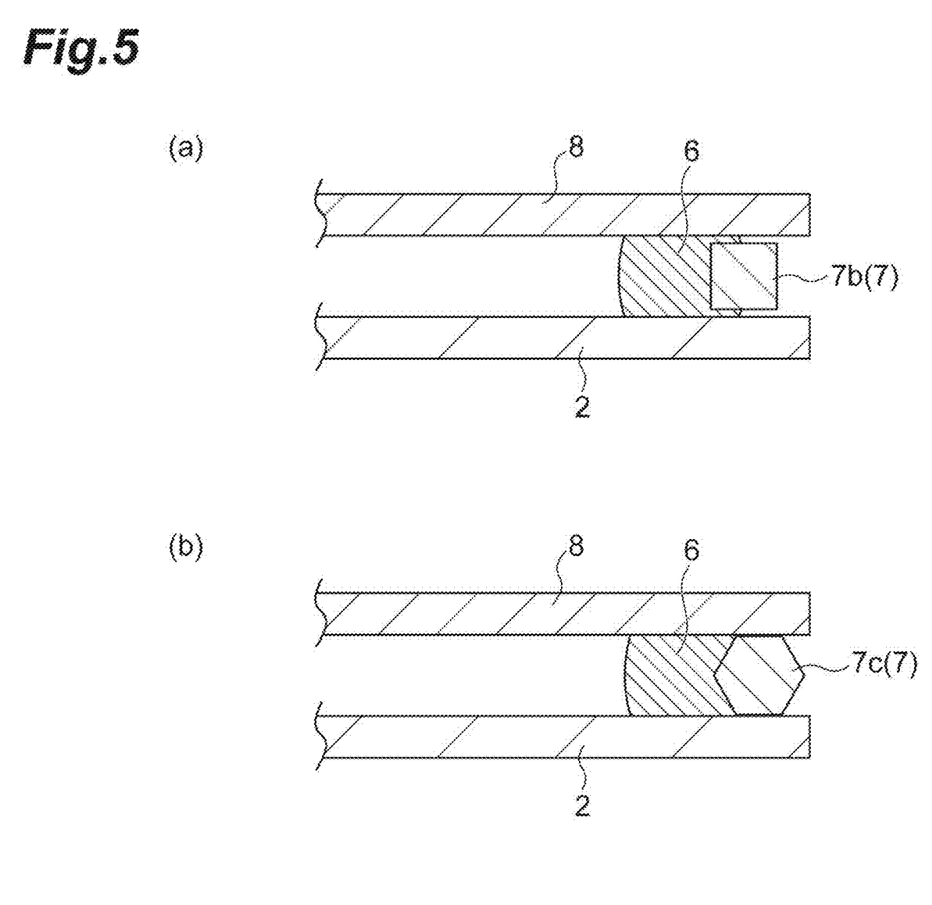
FIG. 5 is a schematic view for describing a radiation detector according a modification example.
Figure 6:
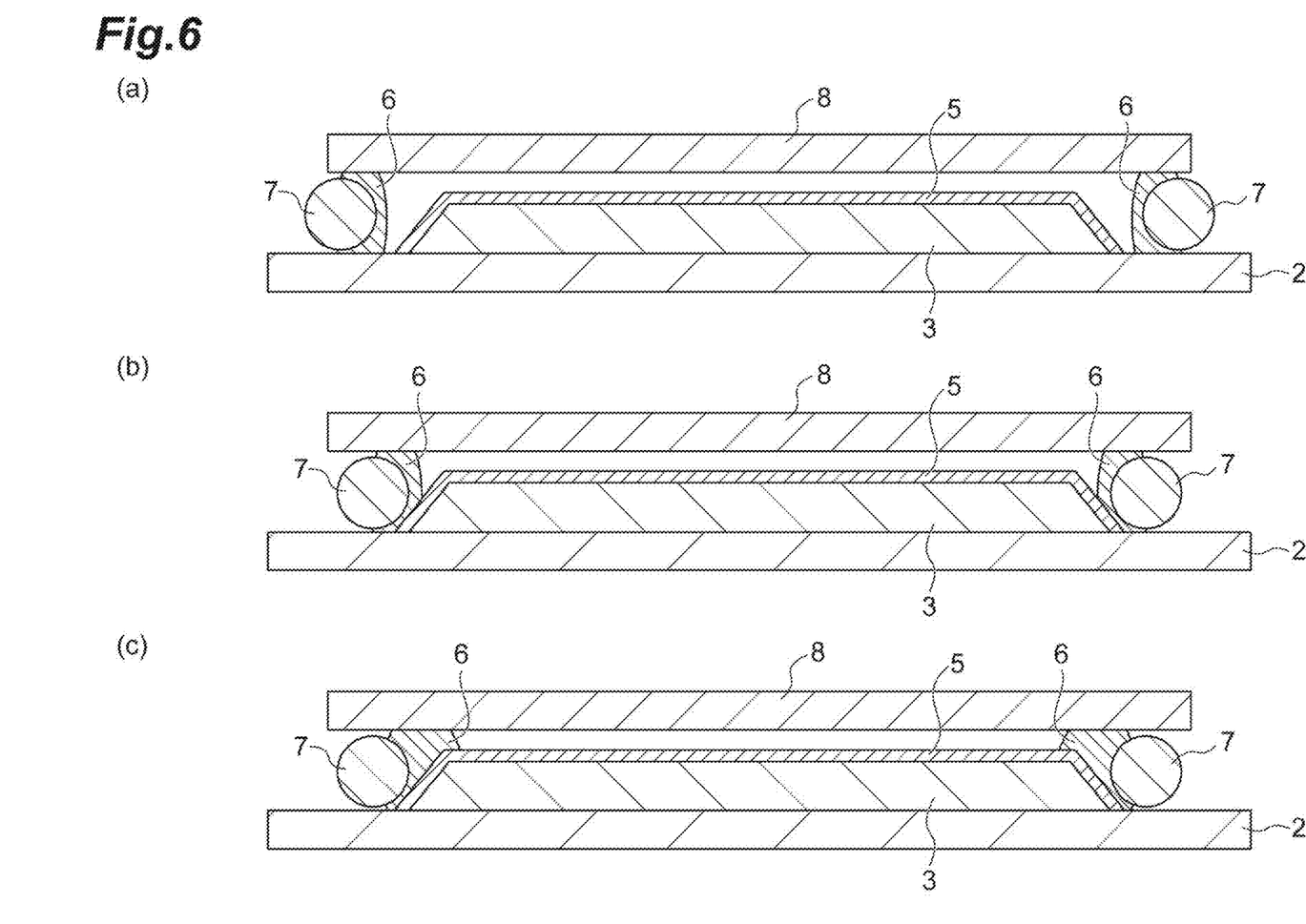
FIG. 6 is a schematic view for describing a radiation detector according a modification example.
Figure 7:
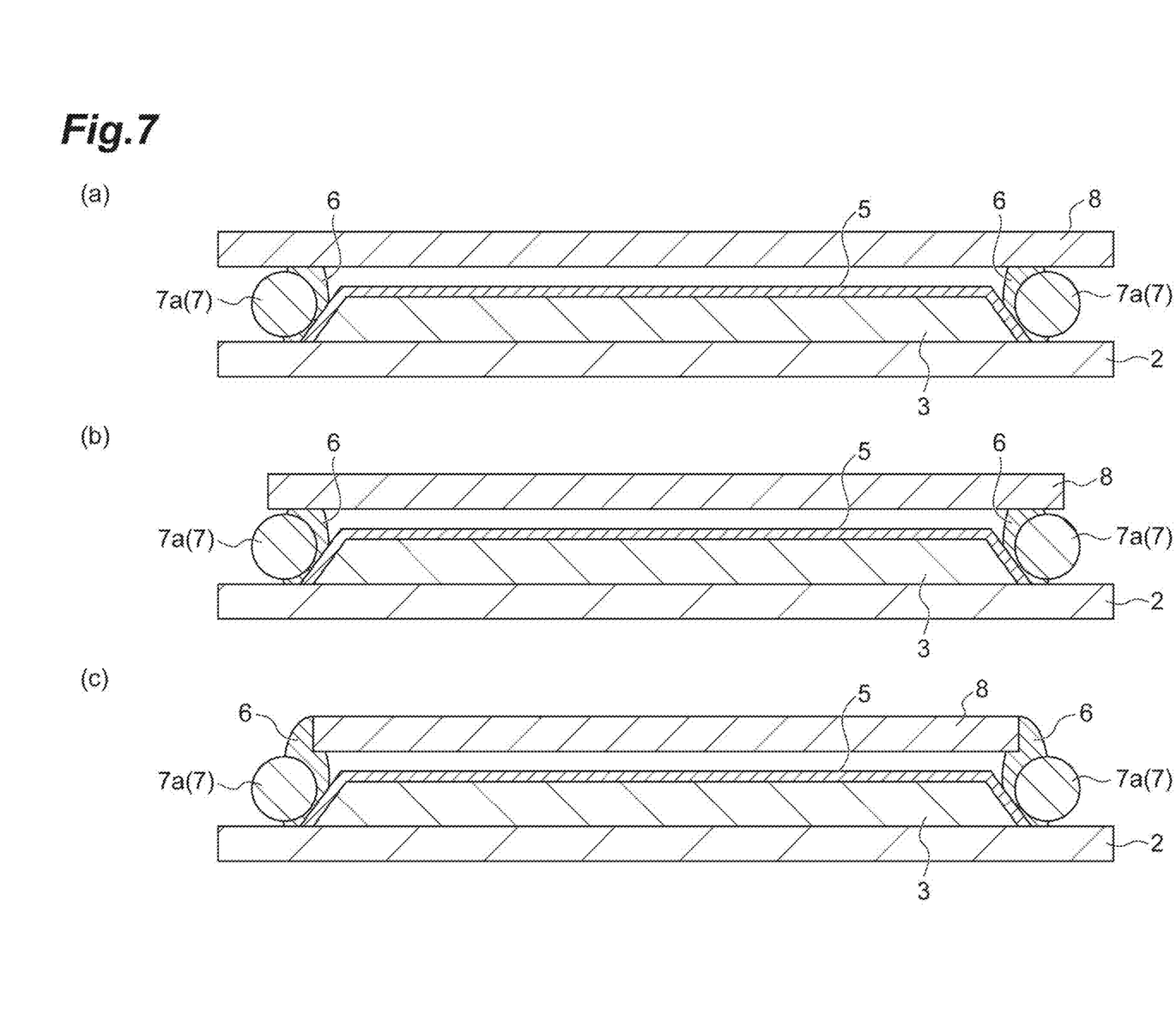
FIG. 7 is a schematic view for describing a radiation detector according a modification example.

Hereinabove, an embodiment has been described in detail with reference to the drawings. However, their specific configurations are not limited to the embodiment. For example, the disposing location, the shape, and the like of each of the elements in the embodiment are merely examples and are not limited thereto. Hereinafter, each of modification examples according to the embodiment of the present invention will be described mainly in regard to configurations different from those of the embodiment described above. The same reference signs are applied to the same elements or members, and detailed description will be omitted. In FIG. 5 to FIG. 7 referred to in the following description, even when the resin frame 6 is formed with the first resin frame 6a and the second resin frame 6b, the first resin frame 6a and the second resin frame 6b are depicted as the integrated resin frame 6.

FIGS. 5(a) and 5(b) are cross-sectional views illustrating modification examples regarding the shape of the frame member. In FIG. 5, only a part in the vicinity of the resin frame is illustrated, and the scintillator layer and the intermediate layer are omitted. As illustrated in FIG. 5(a), the shape of a glass rod 7b constituting the frame member 7 may be a quadrangular prism shape. In addition, as illustrated in FIG. 5(b), the shape of a glass rod 7c constituting the frame member 7 may be a hexagonal prism shape. Since the glass rods 7b and 7c having a prism shape are unlikely to roll, positioning of the glass rods 7b and 7c can be easily performed. In addition, since the bottom surface and the upper surface of the glass rods 7b and 7c can come into surface contact with the sensor panel 2 and the protective plate 8, stability of the shape can be easily retained.

FIGS. 6(a) to 6(c) are cross-sectional views illustrating modification examples in which the resin frame is disposed at a different position. The embodiment described above has illustrated an example in which the resin frame 6 is formed such that the inner edge of the resin frame 6 and the outer edge of the intermediate layer 5 are in contact with each other. However, the embodiment is not limited thereto. As illustrated in FIG. 6(a), the resin frame 6 may be formed away from the outer circumferential edge of the scintillator layer 3 and the intermediate layer 5. In addition, as illustrated in FIG. 6(b), the resin frame 6 may be formed to be in contact with inclined surfaces of the scintillator layer 3 and the intermediate layer 5. In addition, as illustrated in FIG. 6(c), the resin frame 6 may be faulted to be in contact with the upper surfaces of the scintillator layer 3 and the intermediate layer 5.

FIGS. 7(a) to 7(c) are cross-sectional views illustrating modification examples in which the protective plate has a different size. The embodiment described above has illustrated an example of the protective plate 8 which is larger than the frame member 7 and is smaller than the sensor panel 2. However, the embodiment is not limited thereto. For example, as illustrated in FIG. 7(a), the protective plate 8 may have substantially the same size as the size of the sensor panel 2 in a direction along the main surface 2s. In addition, as illustrated in FIG. 7(b), the protective plate 8 may be smaller than the outer edge of the frame member 7 and may be larger than the inner edge of the frame member 7 in a direction along the main surface 2s. In this example, the protective plate 8 extends to the outer side from the center of the glass rods 7a. In addition, as illustrated in FIG. 7(c), the protective plate 8 may have substantially the same size as that of the inner edge of the frame member 7 in a direction along the main surface 2s. In this case, the resin frame 6 extends to the outer side from the protective plate 8.

Figure 8:
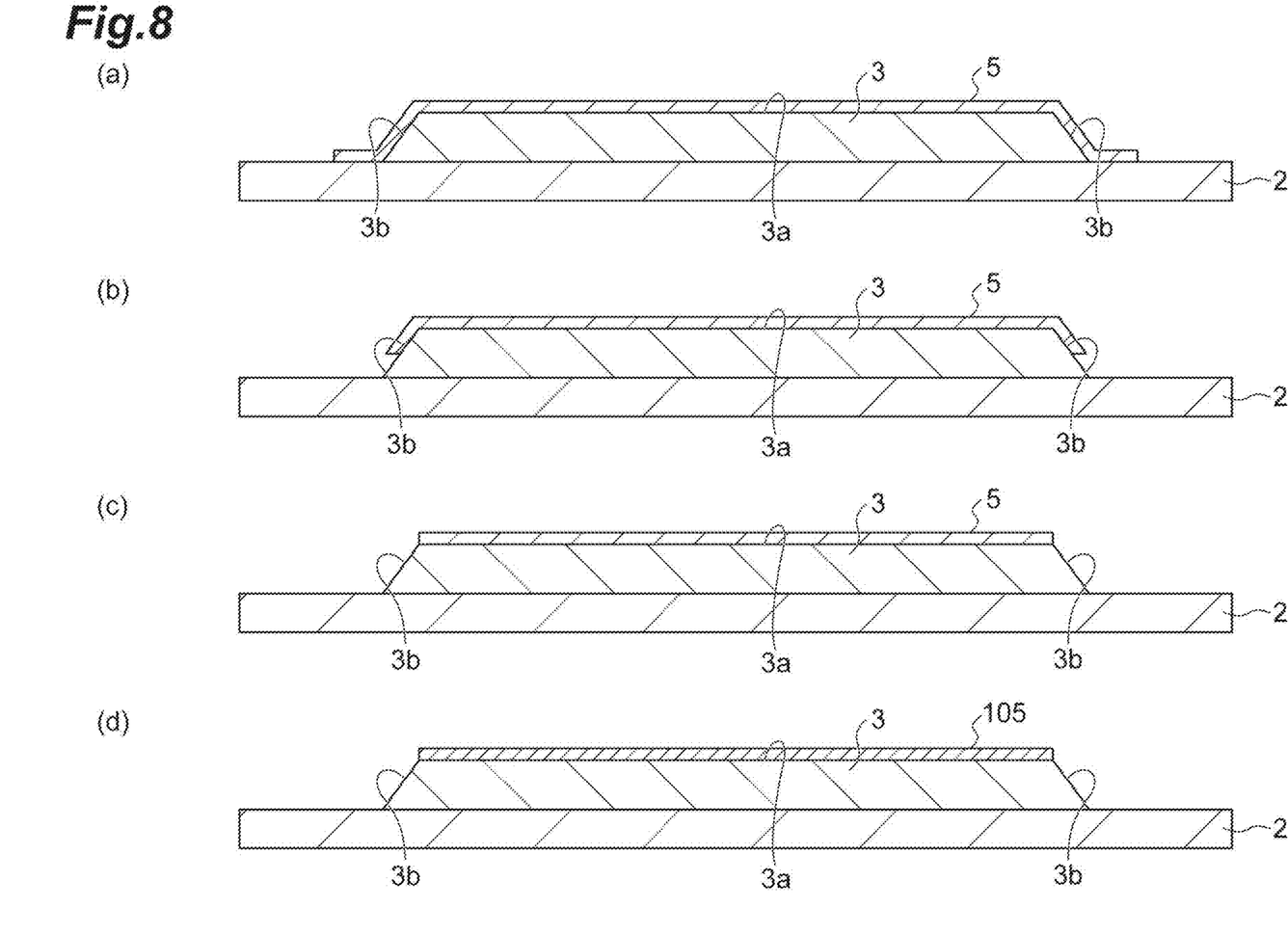
FIG. 8 is a schematic view for describing a radiation detector according a modification example.

FIGS. 8(a) to 8(c) are cross-sectional views illustrating modification examples regarding the shape of the intermediate layer 5. In FIG. 8, the resin frame 6, the frame member 7, and the protective plate 8 are omitted. The disposing locations and the like of the resin frame 6, the frame member 7, and the protective plate 8 may employ the configuration of the embodiment and each of the modification examples. As illustrated in FIG. 8(a), the intermediate layer 5 may extend not only to the front surface 3a and the side surface 3b of the scintillator layer 3 but also to a part around the scintillator layer 3 on the main surface 2s of the sensor panel 2. In this case, the scintillator layer 3 is more reliably covered with the intermediate layer 5. In addition, as illustrated in FIG. 8(b), the intermediate layer 5 may extend to an intermediate position on the side surface 3b of the scintillator layer 3 in a vertical direction. In this case, the intermediate layer 5 is away from the main surface 2s. In addition, as illustrated in FIG. 8(c), only the front surface 3a of the scintillator layer 3 may be covered with the intermediate layer 5. In addition, as illustrated in FIG. 8(d), in place of the intermediate layer 5, the scintillator layer 3 may be covered with a sheet 105 having a function of preventing infiltration of a solvent. In this case, only the front surface 3a of the scintillator layer 3 may be covered with the sheet 105. As illustrated in FIGS. 8(b) to 8(d), when the side surface 3b of the scintillator layer 3 is exposed, as illustrated in FIG. 6(a), the resin frame 6 may be formed away from the outer circumferential edge of the scintillator layer 3.

Figure 9:
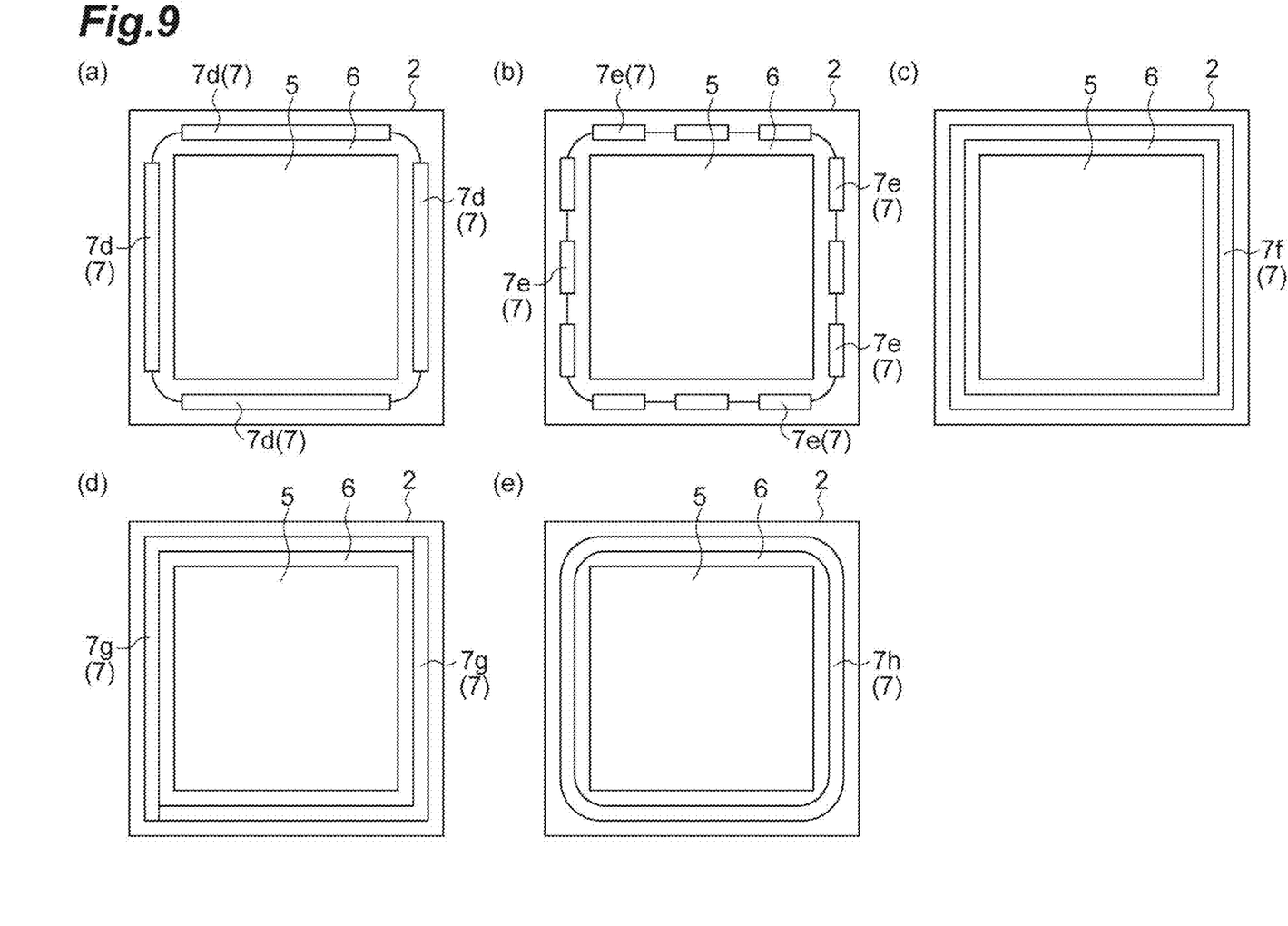
FIG. 9 is a schematic view for describing a radiation detector according a modification example.

FIGS. 9(a) to 9(e) are plan views of modification examples regarding the form of the frame member. In FIG. 9, the protective plate is omitted in the illustration. As illustrated in FIG. 9(a), in place of the glass rods 7a, the frame member 7 may be formed with glass rods 7d shorter than the glass rods 7a. For example, the lengths of the glass rods 7d are approximately the same as the length of one side of the intermediate layer 5 along the main surface 2s, and the lengths are approximately the same as the length of one side of the scintillator layer along the main surface 2s. In this modification example, four glass rods 7d are disposed away from each other, so that the frame member 7 having a rectangularly annular shape with no corner portions is formed. As illustrated in FIG. 9(b), in place of the glass rods 7a, the frame member 7 may be formed with glass rods 7e shorter than the glass rods 7d. For example, the lengths of the glass rods 7e may be approximately ⅓ of one side of the intermediate layer 5 along the main surface 2s. In this modification example, nine glass rods 7e are annularly disposed away from each other, so that the frame member 7 having a rectangularly annular shape is formed. One side of the frame member 7 having a rectangularly annular shape is formed with three glass rods 7e. As illustrated in FIGS. 9(a) and 9(b), the glass rods 7d and 7e constituting the frame member 7 may be away from each other.

In addition, as illustrated in FIG. 9(c), in place of the four glass rods 7a, a single glass rod 7f formed in a rectangular frame shape may be used as the frame member 7. In addition, as illustrated in FIG. 9(d), in place of the glass rods 7a, the frame member 7 may be formed with a pair of glass rods 7g formed in an L-shape. In this modification example, two glass rods 7g are disposed in a rectangular frame shape, so that the frame member 7 is formed. In addition, as illustrated in FIG. 9(e), in place of the four glass rods 7a, a single glass rod 7h having a rectangularly annular shape with curved corner portions may be used as the frame member 7.

In addition, the embodiments described above have illustrated an example of a protective plate having a flat plate shape. However, for example, a protective plate having a flat plate shape with bending may be used. In this case, the protective plate may have a bent shape such that the distance from the main surface to the central part of the protective plate becomes greater than the distance from the main surface to the surrounding part of the protective plate. In addition, the protective plate may have a bent shape such that the distance from the main surface to the central part of the protective plate becomes smaller than the distance from the main surface to the surrounding part of the protective plate.

In addition, an example in which the frame member is formed of a glass material has been illustrated. However, the configuration is not limited thereto. For example, the frame member may be formed of a metal material such as aluminum.

In addition, an example of ultraviolet curing resin has been illustrated as a resin material forming the resin frame. However, the configuration is not limited thereto. For example, the resin frame may be formed of thermosetting resin. In addition, the first resin frame and the second resin frame may be formed of materials different from each other.

In addition, an example in which a space is formed between the scintillator layer and the intermediate layer, and the protective plate has been illustrated. However, for example, the space may be filled with a filler made of an elastic material.

In addition, each of the embodiments and the modification examples can mutually employ the configuration of one another. For example, in the modification examples illustrated in FIG. 6, FIG. 7, and the like, in place of the glass rods 7a, the configurations of the glass rods 7b and 7c may be employed.

Example

Figure 10:
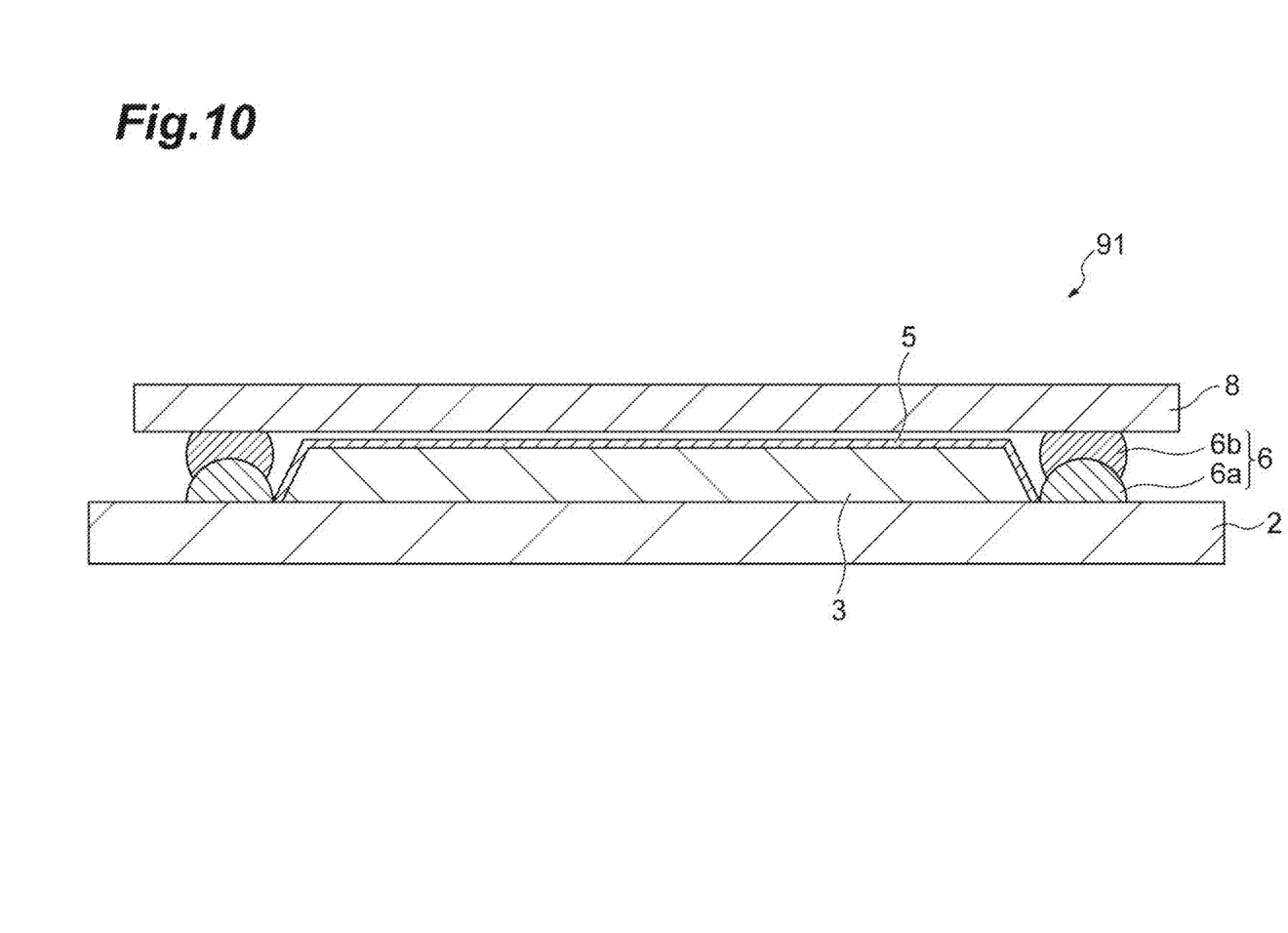
FIG. 10 is a cross-sectional view illustrating a radiation detector according to a comparative example.

FIG. 10 is a cross-sectional view illustrating a radiation detector 91 according to a comparative example. The radiation detector 91 includes the sensor panel 2, the scintillator layer 3, the intermediate layer 5, the resin frame 6, and the protective plate 8. The radiation detector 91 differs from the radiation detector 1A of the embodiment described above only in that the frame member 7 is not included. In the present Example, an experiment was performed regarding moisture barrier performance that varied depending on the presence or absence of the frame member 7, with the radiation detector 1A having the frame member 7 and the radiation detector 91 having no frame member 7 used as samples. In the experiment, each of the samples was disposed inside a thermostatic chamber in which the temperature was set to 50° C. and the relative humidity was adjusted to 90%, and changes in X-ray characteristics (the resolution and the amount of emitted light) were measured. Table 1 shows measurement results of the resolution. In addition, Table 2 shows measurement results of the amount of emitted light.

TABLE 1

| | | Time (hour) | | | | | | | | | | |
|---|---|---|---|---|---|---|---|---|---|---|---|---|
| | | 0 | 27 | 48 | 96 | 164 | 260 | 332 | 428 | 596 | 832 | 1168 |
| Frame member | Absent | 100% | 101% | 100% | 99% | 99% | 94% | 90% | 80% | 64% | 42% | — |
| | Present | 100% | 99% | 100% | 98% | 99% | 100% | 99% | 98% | 99% | 98% | 97% |

TABLE 2

| | | \multicolumn{11}{c}{Time (hour)} | | | | | | | | | | |
|---|---|---|---|---|---|---|---|---|---|---|---|
| | | 0 | 27 | 48 | 96 | 164 | 260 | 332 | 428 | 596 | 832 | 1168 |
| Frame member | Absent | 100% | 99% | 99% | 99% | 97% | 92% | 88% | 85% | 78% | 80% | — |
| | Present | 100% | 99% | 99% | 100% | 100% | 98% | 98% | 99% | 96% | 97% | 95% |

Table 1 shows relative values of a contrast transfer function (CTF: resolution) with the lapse of each time, when the CTF in an initial stage is 100%. In addition, Table 2 shows relative values of the amount of emitted light with the lapse of each time, when the amount of emitted light of the scintillator layer in the initial stage is 100%. From both the results, when a frame member was included, no significant deterioration was observed in the performance of the radiation detector, compared to the case in which no frame member was included. From such results, it was checked that moisture barrier properties of a scintillator layer in the radiation detector could be enhanced by having a frame member.

INDUSTRIAL APPLICABILITY

According to a method of manufacturing a radiation detector of an embodiment, it is possible to enhance moisture barrier properties in a region in which a scintillator layer are formed.

REFERENCE SIGNS LIST

1A Radiation detector
2 Sensor panel
3 Scintillator layer
5 Intermediate layer
6 Resin frame
6a First resin frame
6b Second resin frame
7 Frame member
7a Glass rod
8 Protective plate

The invention claimed is:

1. A method of manufacturing a radiation detector comprising:
   a first step of forming a scintillator layer including a plurality of columnar crystals on a main surface of a sensor panel including a plurality of photoelectric converting elements by a vapor phase deposition method;
   a second step of forming a resin frame on the main surface to surround the scintillator layer and disposing a frame member made of an inorganic solid material to be in contact with the resin frame along an outer side of the resin frame in a direction along the main surface;
   a third step of sealing the scintillator layer by bonding a protective plate to the resin frame, wherein the protective plate is bonded to the resin frame with the frame member disposed between the sensor panel and protective plate such that the protective plate and frame member overlap, and when the protective plate is bonded to the resin frame, a height of the frame member is substantially equal to a height of the resin frame; and
   a fourth step of curing the resin frame.

2. The method of manufacturing a radiation detector according to claim 1,
   wherein the resin frame includes a first resin frame and a second resin frame, and
   wherein in the second step, the first resin frame is formed to surround the scintillator layer, the frame member is disposed to be in contact with the first resin frame along the outer circumference of the first resin frame, and the second resin frame is formed on the first resin frame to surround the scintillator layer.

3. The method of manufacturing a radiation detector according to claim 2,
   wherein in the second step, the first resin frame is cured after the frame member is disposed and before the second resin frame is formed.

4. The method of manufacturing a radiation detector according to claim 1, further comprising:
   a fifth step of covering a front surface and a side surface of the scintillator layer with an intermediate layer, between the first step and the second step.

5. The method of manufacturing a radiation detector according to claim 4,
   wherein in the second step, the resin frame is formed to be in contact with the intermediate layer.

6. The method of manufacturing a radiation detector according to claim 1,
   wherein the resin frame includes ultraviolet curing resin.

7. The method of manufacturing a radiation detector according to claim 1,
   wherein the frame member is a glass rod.

* * * * *